Nov. 19, 1935.  K. RAUCH  2,021,489
SCALE
Filed June 18, 1931   2 Sheets-Sheet 2
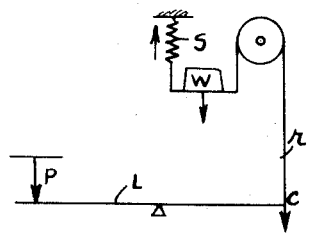
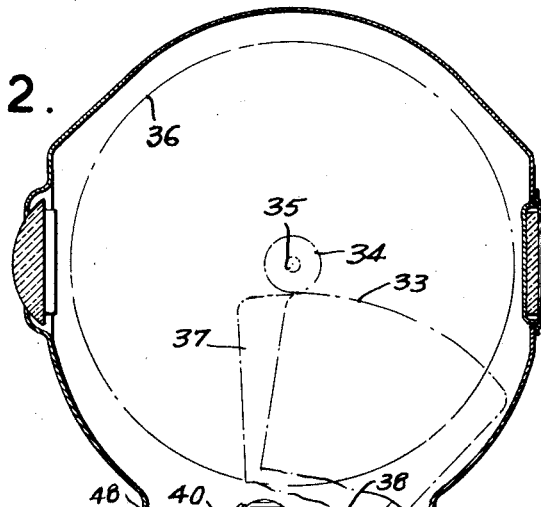
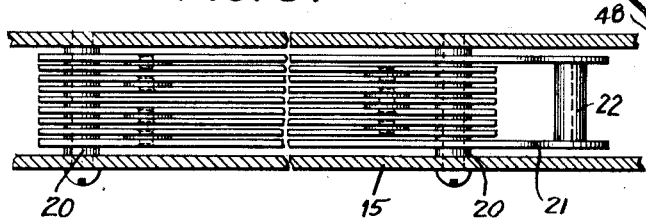
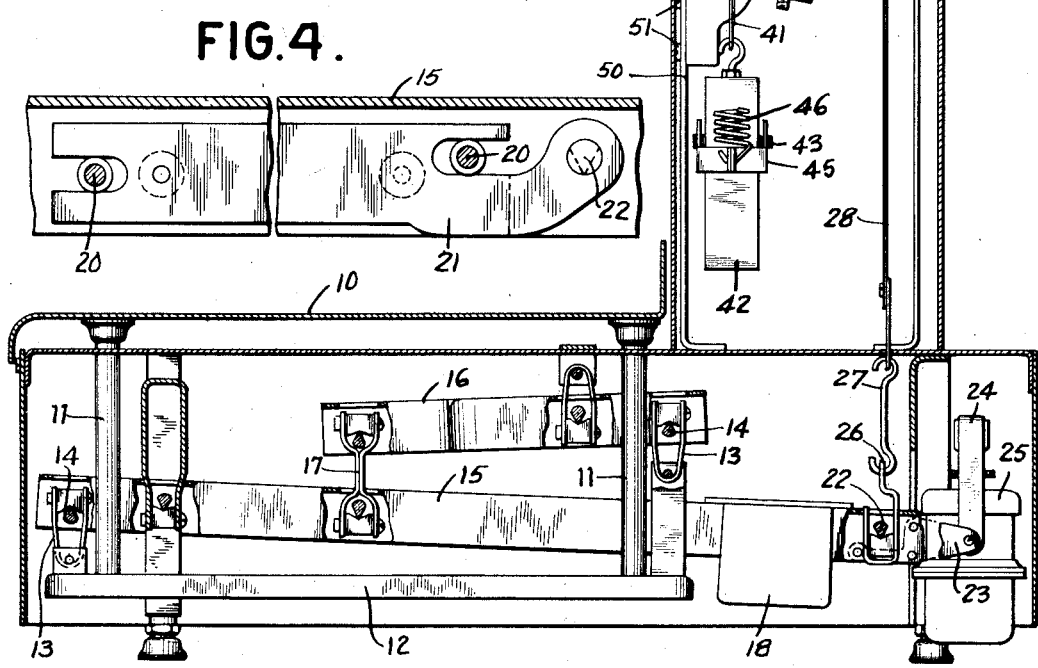
INVENTOR
Konrad Rauch
BY ATTORNEY Patented Nov. 19, 1935

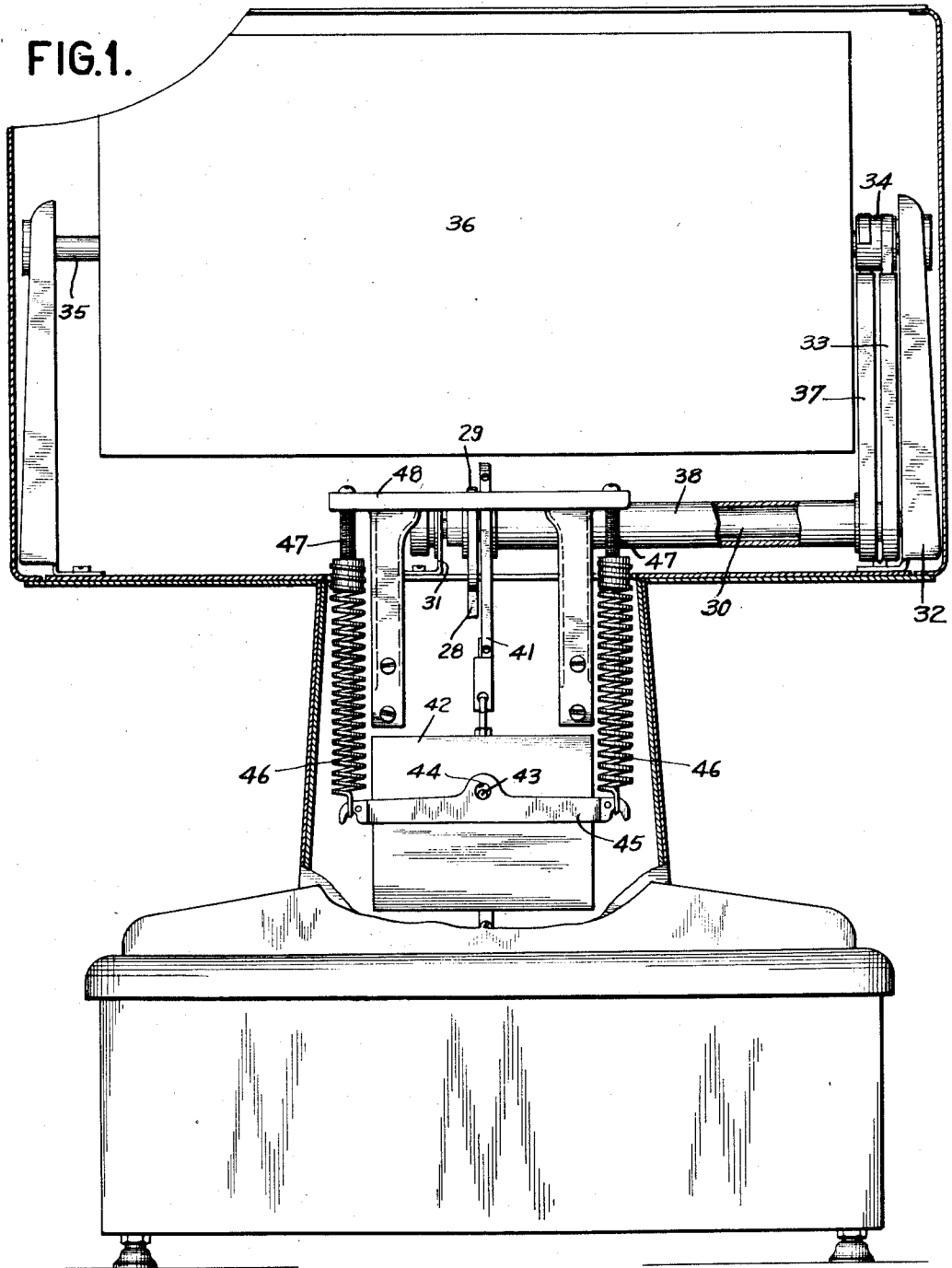

2,021,489

UNITED STATES PATENT OFFICE 2,021,489

SCALE

Konrad Rauch, Dayton, Ohio, assignor, by mesne assignments, to The Hobart Manufacturing Company, Troy, Ohio, a corporation of Ohio Application June 18, 1931, Serial No. 545,203

13 Claims. (Cl. 265—39)

This case relates to force measuring machines, particularly to weighing scales.

The object of the invention is to provide a novel arrangement and structure of scale parts. More specifically, the object is to provide a scale of the spring type which will be equivalent in action to a scale of the descending pendulum type.

Further, the object is to provide a spring counter-balanced scale in which there are tape connections, the tension on which decreases upon application of a load to the scale.

Still further, the object is to provide a spring counterbalanced scale in which the connection from the load support to the springs includes gravity means.

Another object is to provide novel thermostatic means for compensating the effect of changes in temperature upon the spring means.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a front view of the scale with the upper and intermediate housings sectioned to show the interior mechanism.

Fig. 2 is a vertical section through the scale.

Fig. 3 is a horizontal section through the forward end of the long lever showing the thermostat therein.

Fig. 4 is a vertical section through the forward end of the lever showing the thermostatic means carried thereby, and Fig. 5 is a schematic diagram of the scale.

In general, the novel spring scale works according to the principle of the descending pendulum scales. In the latter, when there is no load on the scale, the pendulums are held in their most advanced position by weighted levers or the like. When a load is placed on the scale, the weighted levers or the like are more or less counterbalanced, depending on the load, thereby decreasing their pull on the pendulums which move to lower positions. Thus, the connections between the levers and the pendulums usually including tapes are tensioned most when there is no load on the scale and less as the load is applied to the scale in proportion to the magnitude of the load.

A similar action is obtained in a spring scale according to the present invention by connecting a descending member, preferably a weight to spring counterbalance means. The weight is connected to a tape or ribbon operatively connected to the load support. When there is no load on the scale, the weight is in uppermost position and the pull on the tape greatest. When a load is placed on the support, the tape tends to become slack, the slack is taken up by descent of the weight. However as the weight descends, it stretches the spring counterbalance. This decreases the tension on the tape connections. To make this clear, refer to the schematic diagram (Fig. 5). The load on the platform is represented by P acting on one arm of the base lever L in opposition to the counterweight C carried by the other arm of the lever. The total force exerted by the lever on the lower end of the ribbon $r$ may be represented as: $C-P$.

Connected to the other end of the ribbon is a weight W partly supported by a spring S. The forces on this end of the ribbon may then be represented as $W-S$. Since the forces acting on the ends of the ribbon must be equal $$C-P=W-S.$$

At no load position, the forces acting on the opposite ends of the ribbon are $C=W-S$.

It is obvious that C is greater than $C-P$ and therefore the pull on the ribbon at each end must be greatest at no load position and must decrease in proportion as the load P increases.

The counterbalancing action of the scale may also be understood from the equation $$C-P=W-S.$$

Since C and W are constant and do not change throughout operation of the scale their effect may be represented as K. An increase in P must be counterbalanced by an increase in S to maintain the equation $S-P=K$.

The increase in S is taken care of by the increase in tension of the spring as it is stretched by the weight W descending when a load is placed on the scale.

Referring now to the drawings in detail, a platform or load support 10 has depending posts 11 carrying a spider 12 connected by yokes 13 to knife edges 14 on long lever 15 and short lever 16.

The short lever 16 is connected by a link 17 with the long lever 15. The long lever carries a counterweight 18 for resisting operation of the lever by the load on the support 10. The long lever 15 at the nose end has two spaced pins 20 on which are slidably guided thermostatic plates 21. The thermostatic plates consist of alternating zinc and steel riveted together at alternate ends. To the outer set of plates 21 is fixed a knife edge or nose iron 22. The central plate is held, at the end opposite the nose iron, to the screw 20 that is remote from the nose iron so that one end of the assembly of plates is held with respect to the lever while the opposite or nose iron end is free to move in response to temperature changes. An extension 23 of the lever is connected to a yoke 24 which operates the plunger of a dash pot 25 to dampen the movement of a lever upon the operation thereof by the load. Connected to the nose iron 22 is a stirrup 26 to which is connected a hook 27, the upper end of which is connected to a tape 28.

The tape 28 is attached at the upper end to the periphery of an arc-shaped sector 29 rigidly carried by a shaft 30 which is journalled between frame pieces 31 and 32, see Fig. 1. Shaft 30 carries an arm 33 having a tape connection to the hub 34 of the drum shaft 35. On this shaft is mounted the usual drum chart 36. Also connected to hub 34 by a tape is an arm 37 carried by a sleeve shaft 38 embracing shaft 30 and having its bearings on the latter. Shaft 38, at the side of sector 29, carries a sector 40 to the periphery of which is attached a tape 41 to the lower end of which is hooked a weight 42. Weight 42 is provided with a pin 43 loosely seated in a hole 44 of an equalizing cross bar 45. To each end of this bar 45 is connected the lower end of a counterbalancing spring 46. The upper ends of the springs are carried by threaded members 47 secured to a zinc casting 48 which serves as a thermostat as will be hereinafter explained. The casting is fastened to the column frame 50 by means of screws 51. In operation, at zero load, the counterweight 18 on lever 15 counteracts the weight of the load support plus that part of weight 42 not supported by the springs 46. When a load is placed on a platform the counterweight 18 rises thus slacking up on tape 28. Weight 42 thereupon takes up this slack by rotating shaft 38 counterclockwise as viewed in Fig. 2. Arm 37 thereupon rotates hub 34 clockwise which through its tape connection to arm 33 moves the tape in the direction of arm 37. The movement of weight 42 stretches counterbalancing springs 46 increasing the tension thereof. A change in temperature will change the length of the spring and also its resistance. To take care of the change in length a zinc support of suitable character is provided and is indicated as a zinc casting 48 which expands with increase in temperature to proportionally counteract the expansion of the springs. To compensate for loss in resistance of the springs with increase in temperature, thermostats 31 of lever 15 expand to increase the effective length of the lever arm carrying counterweight 18.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. A scale comprising a load support, a lever system operated by the load support, a weight, means supporting said weight independently of and spaced from the lever system and operatively connected to the lever system for movement of the weight upon application of a load to said support, and resilient counterbalancing means effective directly on the supporting means and weight and distended by movement of said weight upon application of the load to the support for counteracting the gravitational pull of said weight on the supporting means.

2. A scale comprising a load support, a weight suspension means for the weight connected to and operated by the load support, and resilient counterbalancing means connected directly to the weight for counteracting an increased proportion of the gravitational pull of said weight on said suspension means in accordance with an increase in load applied to said load support.

3. A scale comprising a load support, a lever of the first order operated thereby, a weight operatively connected to the power end of the lever to move downwardly under the influence of gravity upon application of a load to the support, and resilient means having a stationary terminus and having a movable terminus connected to the weight for resisting said movement of the weight.

4. A scale comprising a load support, a rockable device, a tape connection between the support and the device, a weight operating said device to keep the tape taut, and spring counterbalance means operatively connected directly to the weight to resist operation of said rockable device by the weight.

5. A scale comprising a load support, indicating means operatively associated therewith, a lever adapted to be operated by a load on said support, a weight operatively connected to the power end of said lever tending to move the indicating means in the same direction in which the latter tends to respond to loads on the support, and resilient counterbalance means acting directly on the weight and tending to move the indicating means in the opposite direction.

6. A scale comprising a load support, a rockable device operatively associated therewith, a weight for moving the device in the same direction in which the device tends to respond to loads on the support, spring counterbalance means directly connected to and resisting operation of the weight, an indicator, a shaft carrying the indicator, and a driving element rigidly carried by said rockable device and rockable therewith for operating said shaft.

7. A scale comprising a load responsive lever of the first order provided with a counterweight adjacent the nose end, spring means, a member intermediate the spring means and the nose end of the lever movable in a direction opposite to the nose end of the lever, connections from said member to the spring means and additional connections from said member to the nose end of the lever for causing the spring to resist movement of the member in a direction opposite to the nose end of the lever.

8. A scale comprising a load responsive lever of the first order, spring means, a weight, a connection between the weight and spring means for supporting the weight partially by the spring means, and a tape and pulley connection from the weight and the spring means to the nose end of the lever for moving the weight upon rocking movement of the lever in a direction to vary the proportion of the weight supported by the spring means.

9. A scale comprising a load support, a lever of the first order operatively connected at one side of its pivot to the support, a rockable device, a tape between the other side of the lever and the rockable device, a weight, a tape for suspending the weight from the rockable device, and resilient means directly connected to the weight for resisting movement of the support under influence of a load.

10. A scale comprising a load responsive member, a pair of telescoped shafts, an indicator, a separate connection from each shaft to the indicator, an operative connection between the load responsive member and one of the shafts, and a weight operatively connected to the other shaft, and spring means for resisting movement of the load responsive member and said weight.

11. A scale comprising a load support, a lever operated thereby, spring counterbalancing means, thermostatic means for compensating effect on the spring of temperature changes, said means comprised of a plurality of parallel plates of different co-efficients of expansion, means for supporting said plates on the lever for slidable movement lengthwise of the lever, a nose iron carried directly by a pair of the plates, and operative connections between the nose iron and the spring means.

12. A scale comprising a drum chart and shaft therefor, a driving device for the chart shaft rockable on an axis parallel to said shaft and having a connection with one end of the shaft, said device extending for a distance parallel to the chart, a load support, a base lever system carrying the support, connections between the base lever system and a part of said device located below an intermediate point of the chart shaft, a weight, spring counterbalancing means below the chart for opposing movement of said base lever system and weight upon application of a load to the support, and a connection from the weight and spring counterbalancing means to the device located below an intermediate point of the chart shaft.

13. A scale comprising a load support, a base lever system for operatively carrying said support, a rockable device, a connection between the base lever system and said rockable device, a weight, a tape connection between the weight and said device, and a counterbalancing mechanism connected to said weight and effective on said rockable device through said tape for resisting movements of said weight upon application of a load to said support.

KONRAD RAUCH.